(12) United States Patent
Suzuki et al.

(10) Patent No.: US 12,488,560 B2
(45) Date of Patent: Dec. 2, 2025

(54) IMAGE PROCESSING DEVICE AND IMAGE PROCESSING METHOD

(71) Applicant: Mitsubishi Electric Corporation, Tokyo (JP)

(72) Inventors: Kenta Suzuki, Tokyo (JP); Tetsutaro Yamada, Tokyo (JP); Hiroshi Kameda, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 326 days.

(21) Appl. No.: 18/227,119

(22) Filed: Jul. 27, 2023

(65) Prior Publication Data

US 2023/0410467 A1 Dec. 21, 2023

Related U.S. Application Data

(63) Continuation of application No. PCT/JP2021/010965, filed on Mar. 18, 2021.

(51) Int. Cl.
*G06V 10/75* (2022.01)
*G06T 7/246* (2017.01)
*G06T 7/292* (2017.01)
*G06V 10/40* (2022.01)

(52) U.S. Cl.
CPC ............ *G06V 10/751* (2022.01); *G06T 7/248* (2017.01); *G06T 7/292* (2017.01); *G06V 10/40* (2022.01); *G06T 2207/10016* (2013.01); *G06T 2207/30196* (2013.01)

(58) Field of Classification Search
CPC ...... G06V 10/751; G06V 10/40; G06T 7/248; G06T 7/292; G06T 2207/10016; G06T 2207/30196; G06T 2207/10024; G06T 7/246
See application file for complete search history.

(56) References Cited

U.S. PATENT DOCUMENTS

| | | | | |
|---|---|---|---|---|
| 11,521,330 | B2* | 12/2022 | Maeda | G06F 18/214 |
| 2016/0260226 | A1* | 9/2016 | Yano | G06V 20/52 |
| 2016/0284098 | A1* | 9/2016 | Okumura | G06T 7/41 |
| 2020/0034649 | A1* | 1/2020 | Oami | G06V 40/10 |
| 2020/0242782 | A1* | 7/2020 | Moriya | G06V 10/761 |

FOREIGN PATENT DOCUMENTS

WO WO 2019/038821 A1 2/2019

OTHER PUBLICATIONS

International Search Report for PCT/JP2021/010965 (PCT/ISA/210) mailed on Jun. 22, 2021.

* cited by examiner

*Primary Examiner* — Oneal R Mistry
*Assistant Examiner* — Jongbong Nah
(74) *Attorney, Agent, or Firm* — Birch, Stewart, Kolasch & Birch, LLP

(57) ABSTRACT

An image processing device includes a detection unit, a feature amount generating unit, a tracking unit, a feature amount change detecting unit, a tracking history extracting unit, and a determination unit, so that when occlusion in a selected cluster has occurred, the image processing device can determine whether or not objects are identical without using data of an image in which the occlusion has occurred. An image in which the occlusion has occurred can be excluded by using the data of the image determined to have no change in the feature amount, whereby a decrease in accuracy of determining whether or not the objects are identical can be suppressed.

6 Claims, 7 Drawing Sheets

IMAGE PROCESSING DEVICE AND IMAGE PROCESSING METHOD

CROSS REFERENCE TO RELATED APPLICATIONS

This application is a Continuation of PCT International Application No. PCT/JP2021/010965, filed on Mar. 18, 2021, all of which is hereby expressly incorporated by reference into the present application.

TECHNICAL FIELD

The present disclosure relates to an image processing technology.

BACKGROUND ART

Patent Literature 1 below discloses a technology for analyzing whether or not objects imaged by a plurality of cameras that images different regions are identical. According to the technology disclosed in Patent Literature 1, an object is tracked in a time direction, and a feature amount of the object and a tracking result of the object are recorded. During searching for an object, clustering of image data is performed on the basis of a result of tracking each object that has been searched for, a cluster having the largest number of images is selected from clusters obtained by clustering, one feature amount is extracted for the cluster selected from image data in the selected cluster, and whether or not objects are identical is determined using the extracted feature amount.

CITATION LIST

Non-Patent Literature

Patent Literature 1: WO 2019/038821 A

SUMMARY OF INVENTION

Technical Problem

Meanwhile, according to the technology disclosed in Patent Literature 1, a cluster having the largest number of images is selected, and thus, there is a problem that an image in which occlusion has occurred may be included in the selected cluster.

The present disclosure has been made to solve such a problem, and an object of one aspect of an embodiment is to provide a technology for determining, when occlusion has occurred, whether or not objects are identical without using data of an image in which the occlusion has occurred.

Solution to Problem

According to one aspect of an image processing device according to an embodiment, the image processing device includes: processing circuitry configured to analyze a first image sequence including a plurality of images obtained by imaging a first region to detect a first object that appears in any one of the images of the first image sequence, and analyze a second image sequence including a plurality of images obtained by imaging a second region different from the first region to detect a second object that appears in any one of the images of the second image sequence; generate a first object feature amount for tracking the first object and a second object feature amount for tracking the second object; track the first object in a time direction within the first image sequence using the first object feature amount to output a tracking result including a plurality of values of the first object feature amount as a first object tracking history, and track the second object in the time direction within the second image sequence using the second object feature amount to output a tracking result including a plurality of values of the second object feature amount as a second object tracking history; detect whether or not the first object feature amount has changed using the first object tracking history to output a detection result as a first feature-amount-change detection result, and detect whether or not the second object feature amount has changed using the second object tracking history to output a detection result as a second feature-amount-change detection result; extract a value of the first object feature amount from the first object tracking history for an image determined to have no change in the first object feature amount to output the extracted value of the first object feature amount and the first object tracking history as a first tracking-history extraction result, and extract a value of the second object feature amount from the second object tracking history for an image determined to have no change in the second object feature amount to output the extracted value of the second object feature amount and the second object tracking history as a second tracking-history extraction result; and determine whether or not the first object and the second object are identical using the first tracking-history extraction result and the second tracking-history extraction result.

Advantageous Effects of Invention

One aspect of the image processing device according to the embodiment enables, when occlusion has occurred, determination as to whether or not objects are identical without using data of an image in which the occlusion has occurred.

DESCRIPTION OF EMBODIMENTS

Figure 1:
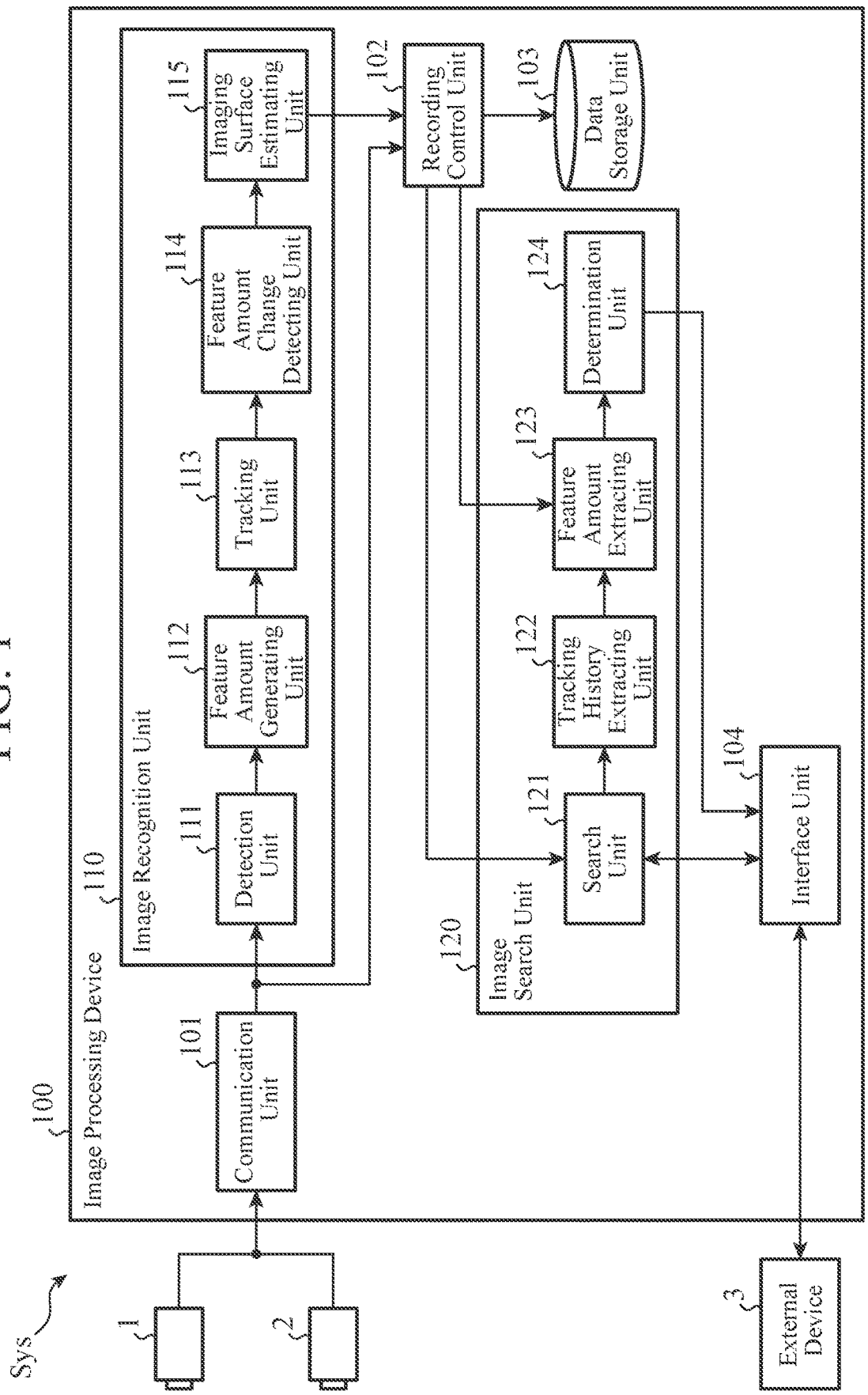
FIG. 1 is a block diagram illustrating a configuration of an image processing system and an image processing device.

Various embodiments of the present disclosure will now be described in detail with reference to the drawings. Note that components denoted by the same reference numerals throughout the drawings have the same or similar configurations or functions.

First Embodiment

An image processing device 100 according to a first embodiment will be described with reference to FIGS. 1 to 10. First, a configuration of an image processing system including the image processing device 100 and a configuration of the image processing device 100 will be described with reference to FIG. 1.

As illustrated in FIG. 1, an image processing system Sys includes a plurality of cameras 1 and 2, an external device 3, and the image processing device 100 connected to the plurality of cameras 1 and 2 and the external device 3. The image processing device 100 performs image processing on image data captured by the plurality of cameras 1 and 2 connected via a communication network. The plurality of cameras 1 and 2 is arranged so as to image different regions. Here, the term "different" means being not the same. Therefore, the expression "different region" includes a case where a certain region and another region partially overlap as well as a case where a certain region and another region do not overlap at all. The number of cameras is not limited to two, and may be three or more. In addition, captured image data is associated with time data indicating the time at which the image has been captured. Further, the image processing device 100 is connected to the external device 3 via an interface unit 104. Examples of the external device 3 include an input/output device for setting a search condition and an external storage.

As illustrated in FIG. 1, the image processing device 100 includes a communication unit 101, an image recognition unit 110, an image search unit 120, a recording control unit 102, a data storage unit 103, and the interface unit 104, as an example. As a modification, the data storage unit 103 may be provided outside the image processing device 100.

(Communication Unit)

The communication unit 101 receives a first image sequence including a plurality of images transmitted from the camera 1 connected via the network, and outputs the received first image sequence to the image recognition unit 110 and the recording control unit 102. The communication unit 101 also receives a second image sequence including a plurality of images transmitted from the camera 2 connected via the network, and outputs the received second image sequence to the image recognition unit 110 and the recording control unit 102.

(Image Recognition Unit)

The image recognition unit 110 performs image recognition processing on the input image sequence. As illustrated in FIG. 1, the image recognition unit 110 includes a detection unit 111, a feature amount generating unit 112, a tracking unit 113, a feature amount change detecting unit 114, and an imaging surface estimating unit 115.

(Detection Unit)

The detection unit 111 analyzes the image sequence input from the communication unit 101. That is, the detection unit 111 analyzes the first image sequence transmitted from the camera 1 and the second image sequence transmitted from the camera 2. The detection unit 111 detects one or more objects appearing in an image included in each image sequence through analysis of each image sequence, and outputs an object detection result to the feature amount generating unit 112. The object detection result includes, for example, the number of detected objects, the time at which the image has been captured, the position of the object, the detection range of the object, the identification result of the object, and the detection reliability of the object. When multiple objects are detected, the object detection result includes the position of each object, the detection range of each object, the identification result of each object, and the detection reliability of each object. Here, the position of the object means a position of the object within an angle of view, or a position in the real space coordinate system of the object obtained by combining camera calibration information and the position of the object within the angle of view. Furthermore, the detection range means a range in which the object is present, and specific examples of the detection range include a contour of the object and a rectangle (bounding box) surrounding the object.

(Feature Amount Generating Unit)

The feature amount generating unit 112 generates an object feature amount to be used for tracking an object from the object detection result input from the detection unit 111. The feature amount generating unit 112 extracts one or more appearance feature amounts for each object from each image on the basis of the position of each object input from the detection unit 111. Examples of the appearance feature amount include feature amounts such as hue, saturation, and brightness in the detection range. Examples of the appearance feature amount are not limited to the above items, and other feature amounts such as pixel values in the RGB color space may be used as the appearance feature amount. The feature amount generating unit 112 outputs the extracted appearance feature amount to the tracking unit 113 as an object feature amount together with the position of the object, the detection range, the imaging time, and the detection reliability.

(Tracking Unit)

The tracking unit 113 tracks each object in the time direction using the object feature amount input from the feature amount generating unit 112, and outputs a tracking history which is a result of tracking to the feature amount change detecting unit 114 as a tracking result. The tracking unit 113 tracks the object in the time direction using a plurality of frames input from the feature amount generating unit 112. Here, the frame is a set of object feature amounts output from the feature amount generating unit 112 at one imaging time. Note that a known multitarget tracking technique (for example, multiple hypothesis multitarget tracking) can be used for the tracking.

The tracking history includes an observation value and a prediction value related to a position, a speed, and a range of each object at each imaging time, and a unique number (tracking ID) for specifying the tracking history. The prediction values of position, speed, and range are generated from past frames using the known multitarget tracking techniques described above. Here, a set of object feature amounts to which the same tracking ID is assigned as a result of tracking each object in the time direction is defined as an object tracking history.

Figure 3:
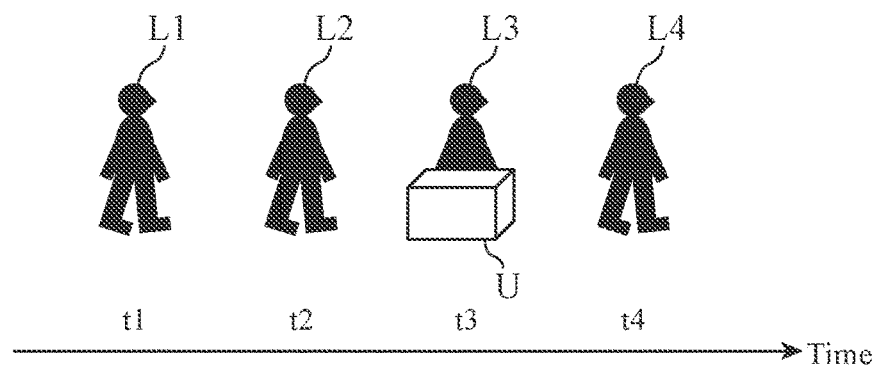
FIG. 3 is a diagram illustrating an example of image data of a person tracked as an object in object tracking processing.

FIG. 3 illustrates a specific example of a case where the tracking target object is a person. In the example of FIG. 3, the tracking unit 113 tracks objects L1 to L4 detected by the detection unit 111 between times t1 to t4. During tracking, occlusion may occur so that a part of the object L3 is hidden by an obstacle U.

Figure 4:
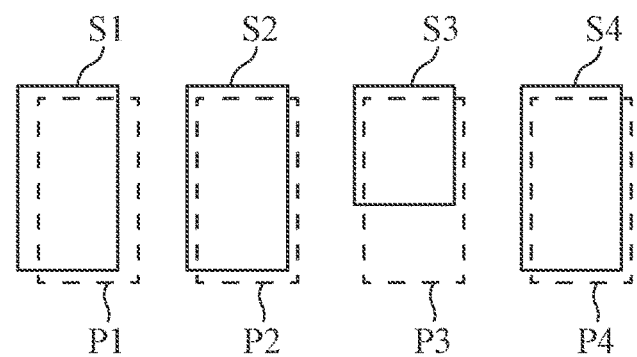
FIG. 4 is a diagram illustrating an example of a result of tracking a person tracked as an object in feature-amount-change detection processing.

FIG. 4 illustrates a specific example of the tracking result with respect to FIG. 3. In the example of FIG. 4, S1 to S4 indicate observation values of a range in which the object is detected during a period from times t1 to t4, and P1 to P4 indicate prediction values of the range during the period from times t1 to t4. The tracking unit 113 generates, from the past frame, a prediction value at a time following a time associated with the past frame. For example, the tracking unit 113 generates the prediction value P2 at time t2 from the observation value S1 at time t1, and generates the prediction value P3 at time t3 from the observation value S2 at time t2. During generation of the prediction value, the prediction value at the past time may also be considered. For example, the tracking unit 113 may consider the prediction value P1 at time t1 when generating the prediction value P2. In this manner, the tracking unit 113 generates the prediction value at a certain time of interest from the frame at the time immediately preceding the time of interest. As a modification, the tracking unit 113 may generate the prediction value at a certain time of interest from the frame at a time preceding the time immediately preceding the time of interest.

(Feature Amount Change Detecting Unit)

The feature amount change detecting unit 114 performs feature-amount-change detection processing of detecting a change in the object feature amount of each object using the object tracking history input from the tracking unit 113. The feature amount change detecting unit 114 outputs a detection result including whether or not the object feature amount has changed and the above-described object tracking history to the imaging surface estimating unit 115 as a feature-amount-change detection result. The feature amount change detecting unit 114 detects a difference between the observation value and the prediction value at a certain time in the object tracking history input from the tracking unit 113.

In the example of FIG. 4, at time t2, a difference in the size of the range between the observation value S2 and the prediction value P2 is small. On the other hand, at time t3, a part of the object L3 is hidden by the obstacle U in FIG. 3. Therefore, only a portion of the range not hidden by the obstacle U is observed as the observation value S3, and thus, the size of the range obtained as the observation value S3 is smaller than the range of the object L2, which is not hidden by the obstacle U, obtained as the observation value S2. Here, the size of the range indicates the area, the width, or the height of the detection range.

At time t2, the prediction value P2 of the range is generated from the observation value S1 of the range at t1, and thus, indicates a range substantially equal to the range of the observation value S1 at time t1. Therefore, a difference in the size of the range between the observation value S2 at time t2 and the prediction value P2 at time t2 is small. When the difference is equal to or less than a predetermined threshold, the detection result of "having no change in object feature amount" is output.

On the other hand, at time t3 at which a part of the object is hidden by the obstacle U, the prediction value P3 of the range indicates a range substantially equal to the range of the observation value S2 at time t2, because the prediction value P3 is generated from the observation value S2 of the range at time t2 at which the object is not hidden by the obstacle. Therefore, comparing the size of the range obtained as the observation value S3 at time t3 and the size of the range obtained as the prediction value P3 at time t3, the difference between them is large. When the difference exceeds the predetermined threshold, the detection result of "having a change in object feature amount" is output.

At time t4, whether or not the feature amount has changed is detected using not the observation value S3 at time t3 at which there is a change in the feature amount but the latest observation value determined as having no change in the feature amount. Specifically, the prediction value P4 of the range at time t4 is generated from the observation value S2 of the range at time t2. The prediction value P4 of the range is generated from the observation value S2 of the range at time t2 at which the object is not hidden by the obstacle U, and thus, indicates a range substantially equal to the range of the observation value S2 at time t2. Therefore, comparing the size of the range obtained as the observation value S4 at time t4 and the size of the range obtained as the prediction value P4 at time t4, the difference between them is small. In this case, the detection result of "having no change in object feature amount" is output.

As a result, only time t3 at which occlusion has temporarily occurred by the obstacle U can be detected as "having a change in the object feature amount". Note that, although the size of the range among the feature amounts has been described here, another parameter, for example, an appearance feature amount may be used during detection of a change in the object feature amount. For example, in the case of using hue, the occurrence of occlusion can be determined by detecting an increase or decrease over time in the number of pixels of a certain color.

(Imaging Surface Estimating Unit)

The imaging surface estimating unit 115 performs imaging-surface estimation processing of estimating an imaging surface from the feature-amount-change detection result input from the feature amount change detecting unit 114. The imaging surface estimating unit 115 estimates the imaging surface of each object from the speed of each object included in the object tracking history. The imaging surface estimating unit 115 outputs an imaging-surface estimation result including the result of estimating the imaging surface and the above-described feature-amount-change detection result to the recording control unit 102.

Figure 5:
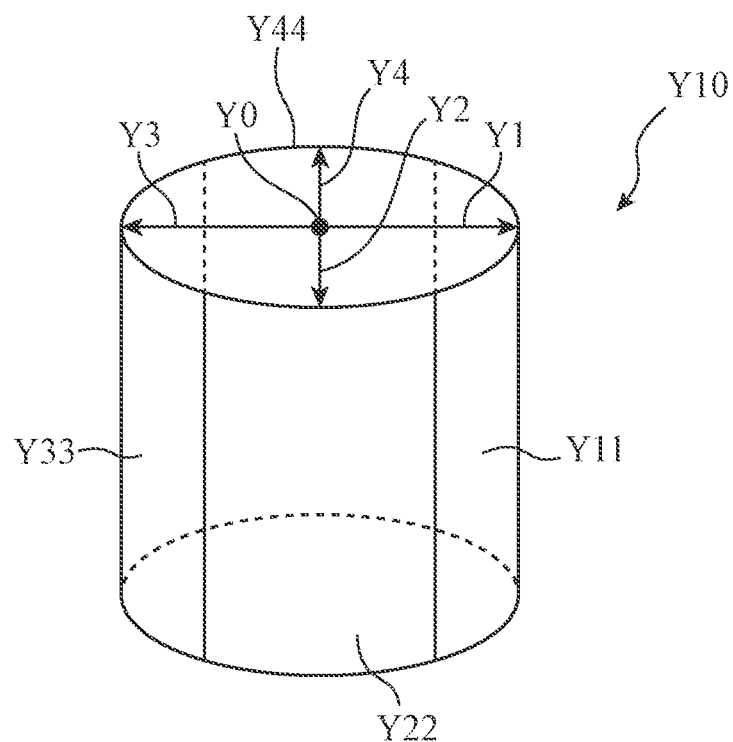
FIG. 5 is a diagram for describing an example of modeling of an imaging surface of an object.

FIG. 5 is a diagram for describing an example of modeling of an imaging surface of an object. Although the description will be given based on an example in which the target object is modeled as a cylinder, a specific example of the modeling is not limited to the cylinder, and a polygon or a sphere may be used. In FIG. 5, a reference surface Y11 related to the imaging surface is set with respect to a model Y10. As illustrated in FIG. 5, the reference surface Y11 is one side face of the model Y10 indicated by the ends of an arrow Y1. Arrows Y2 to Y4 are set every 90 degrees clockwise from the arrow Y1 about a center Y0 of the cross section of the model, and reference surfaces Y22 to Y44 indicated by the ends of the arrows Y2 to Y4 are set. As in the previous case, each of the reference surfaces Y22 to Y44 is one side face of the model Y10 indicated by the ends of the corresponding one of the arrows Y2 to Y4. The imaging surface estimating unit 115 assigns any one of the reference surfaces Y11 to Y44 at each time as the imaging surface of each object. Note that the assignment of the speed and the imaging surface is determined in advance.

Figure 6:
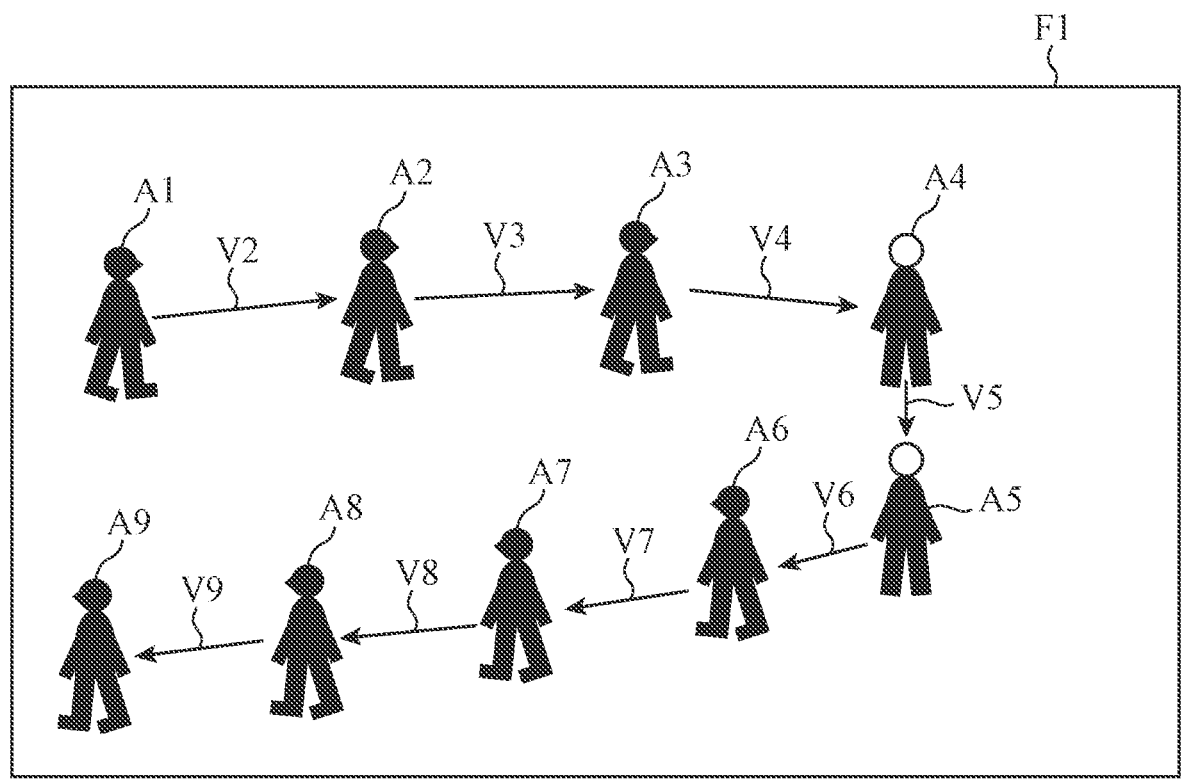
FIG. 6 is a diagram illustrating an example of a result of tracking a person tracked as an object in imaging-surface estimation processing.

FIG. 6 illustrates an example of a result of tracking a person tracked as an object. In FIGS. 6, A1 to A9 indicate temporal changes of positions of the same object in an image region F1. In addition, V2 to V9 indicate speeds of the respective objects generated by the tracking unit 113. Here, the speed is a change amount per unit time of the position, and is a two-dimensional or three-dimensional vector. In the model Y10, the front surface of the object is defined as the reference surface Y11.

In FIG. 6, the speeds V2 to V4 of the objects A2 to A4 are from left to right in the image region F1. In this case, it is determined that the imaging surface of the target object is the reference surface Y22 in the model Y10 from the preset assignment. Next, the speed V5 of the object A5 is from top to bottom in the image region F1. It is determined that the imaging surface of the target object is the reference surface Y11 in the model Y10 from the preset assignment. Next, the speeds V6 to V9 of the objects A6 to A9 are from right to left in the image region F1. In this case, it is determined that the imaging surface of the target object is the reference surface Y44 in the model Y10 from the preset assignment. Similarly, it is determined that the imaging surface of the object (not illustrated) from bottom to top in the image region is the reference surface Y33. As described above, the imaging surface of each object can be estimated by defining in advance the relationship between the direction of the speed in a screen and the reference surface in the model Y10.

(Recording Control Unit)

The recording control unit 102 stores, in the data storage unit 103, the imaging-surface estimation result input from the imaging surface estimating unit 115 and the data of the image of the image sequence input from the communication unit 101 in association with each other.

(Image Search Unit)

The image search unit 120 receives a search condition set by the external device 3 via the interface unit 104, and searches for the object tracking history matching the set search condition. As illustrated in FIG. 1, the image search unit 120 includes a search unit 121, a tracking history extracting unit 122, a feature amount extracting unit 123, and a determination unit 124.

(Search Unit)

The search unit 121 accesses the data storage unit 103 via the recording control unit 102 and searches for the object tracking history matching the search condition. The search unit 121 extracts a plurality of object tracking history candidates matching the set search condition. This extraction is performed by specifying one or more conditions such as a range of imaging time and a camera that images an object. The search unit 121 outputs the object tracking history candidates matching the search condition to the tracking history extracting unit 122.

(Tracking History Extracting Unit)

The tracking history extracting unit 122 extracts the value of an object feature amount obtained by excluding data determined as "having a change in object feature amount" from values of a plurality of object feature amounts included in the object tracking history candidates input from the search unit 121. That is, the tracking history extracting unit 122 extracts the value of the object feature amount of an image determined to have no change in the object feature amount from the object tracking history candidates. Furthermore, the tracking history extracting unit 122 creates a set of objects having the same imaging surface with respect to data determined as "having no change in object feature amount", and outputs the created set and the object tracking history to the feature amount extracting unit 123 as a tracking-history extraction result. In this manner, by excluding the data determined to have a change in the object feature amount, it is possible to determine whether or not objects imaged by the cameras that image different regions are identical without using data of an image in which occlusion has occurred.

As a result, the accuracy of determining whether or not the objects are identical is improved.

(Feature Amount Extracting Unit)

The feature amount extracting unit 123 extracts data of an image including an object corresponding to the tracking-history extraction result from the data storage unit 103 via the recording control unit 102 on the basis of the tracking-history extraction result input from the tracking history extracting unit 122. The feature amount extracting unit 123 generates, on the basis of an image feature amount obtained from data of a plurality of images corresponding to a set of objects having the same imaging surface, one comparison feature amount for the set and outputs the generated comparison feature amount to the determination unit 124. Therefore, for each object tracking history, a maximum of the same number of the comparison feature amounts as the number of the imaging surfaces of the model, that is, four comparison feature amounts, are output to the determination unit 124. Here, as the image feature amount, a feature amount used in a known technique for determining whether or not objects are identical can be used. Examples thereof include a histogram related to color information and shape information. Furthermore, during generation of the comparison feature amount, the image feature amounts included in the set may be averaged to generate the comparison feature amount.

(Determination Unit)

The determination unit 124 compares the object tracking histories having the same imaging surface between different imaging regions among the comparison feature amounts input from the feature amount extracting unit 123, and determines whether or not the object tracking histories are the same. A known technology for determining whether or not objects are identical to each other, for example, histogram intersection can be used to determine whether or not the objects are identical to each other. Alternatively, machine learning (for example, deep learning or support vector machine) may be used to determine whether or not the objects are identical to each other, for example. The determination unit 124 outputs a determination result to the external device 3 via the interface unit 104.

Figure 2A:
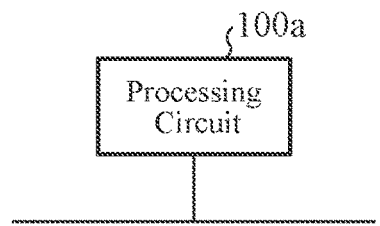
FIG. 2A is a diagram illustrating a hardware configuration example of the image processing device.
Figure 2B:
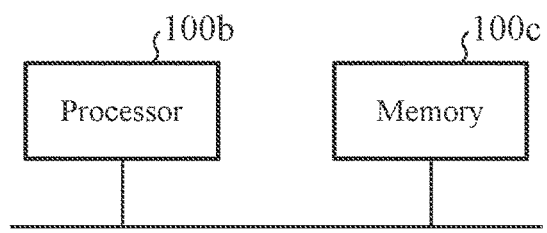
FIG. 2B is a diagram illustrating a hardware configuration example of the image processing device.

Next, a hardware configuration example of the image processing device 100 will be described with reference to FIGS. 2A and 2B. FIG. 2A and FIG. 2B are diagrams illustrating a hardware configuration example of the image processing device 100. As an example, the functions of the communication unit 101, the image recognition unit 110, the recording control unit 102, the image search unit 120, and the interface unit 104 in the image processing device 100 are implemented by a processing circuit 100a as illustrated in FIG. 2A. That is, the image processing device 100 includes the processing circuit 100a for implementing the above functions. As another example, the functions of the communication unit 101, the image recognition unit 110, the recording control unit 102, the image search unit 120, and the interface unit 104 in the image processing device 100 may be implemented by a processor 100b reading and executing a program stored in a memory 100c as illustrated in FIG. 2B.

(Image Recognition Processing)

Figure 7:
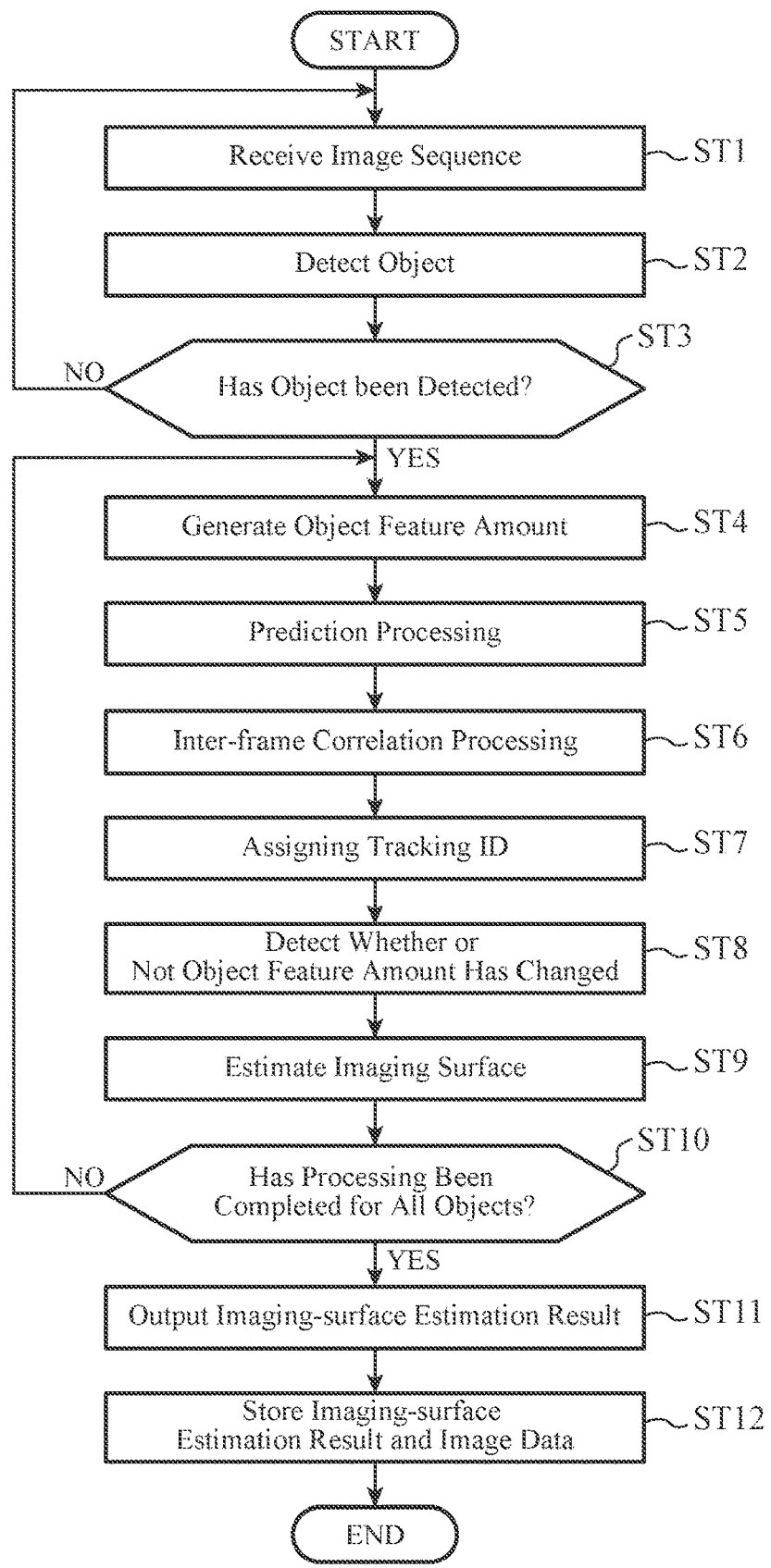
FIG. 7 is a flowchart illustrating image recognition processing.

Next, the operation of the image processing device 100 will be described. First, image recognition processing performed by the image processing device 100 will be described with reference to FIG. 7. FIG. 7 is a flowchart illustrating the image recognition processing.

The communication unit 101 receives an image sequence captured by the cameras 1 and 2 connected via the communication network (step ST1), and outputs the received image sequence to the detection unit 111 of the image recognition unit 110.

The detection unit 111 attempts to detect an object appearing in the input image sequence (step ST2). The detection unit 111 determines whether or not an object has been detected (step ST3). If no object has been detected (step ST3: No), the processing returns to step ST1. On the other hand, if an object has been detected (step ST4: Yes), the processing proceeds to step ST4, and the feature amount generating unit 112 generates an object feature amount such as the time at which the object has been imaged, the appearance feature amount, the position, or the detection range of the detected object (step ST4), and outputs the object feature amount to the tracking unit 113.

The tracking unit 113 generates, from an object feature amount of a past frame, an object feature amount predicted at a time following the time associated with the past frame (step ST5). For example, the tracking unit 113 generates, from a range of the object observed at the past time, a range of the object predicted at a time immediately following the past time. The tracking unit 113 determines whether or not the generated prediction value of the object and the object feature amount observed at the time of the prediction value are the same (step ST6). If they are determined to be the same in step ST6, the tracking unit 113 assigns the tracking ID assigned to the past frame determined to be the same to the observed object feature amount (step ST7). If they are not determined to be the same in step ST6, the tracking unit 113 assigns a unique tracking ID that does not overlap with the past tracking ID to the observed object feature amount (step ST7). After assigning the tracking ID, the tracking unit 113 outputs a tracking result including the object tracking history to the feature amount change detecting unit 114.

The feature amount change detecting unit 114 detects whether or not the object feature amount has changed using the object tracking history input from the tracking unit 113 (step ST8), and outputs a result of the detection to the imaging surface estimating unit 115 as a feature-amount-change detection result.

The imaging surface estimating unit 115 estimates an imaging surface from the feature-amount-change detection result input from the feature amount change detecting unit 114 (step ST9).

The feature amount generating unit 112, the tracking unit 113, the feature amount change detecting unit 114, and the imaging surface estimating unit 115 determine whether or not processing has been performed on all the objects input from the detection unit 111 (step ST10). If the processing has not been performed on all the objects (step ST10: No), the processing returns to step ST4. On the other hand, if the processing has been performed on all the objects (step ST10: Yes), the imaging surface estimating unit 115 outputs the imaging-surface estimation result including the object tracking history to the recording control unit 102 (step ST11).

The recording control unit 102 stores, in the data storage unit 103, the imaging-surface estimation result input from the imaging surface estimating unit 115 and the data of the image of the image sequence input from the communication unit 101 in association with each other (step ST12), and ends the processing.

(Image Search Processing)

Figure 8:
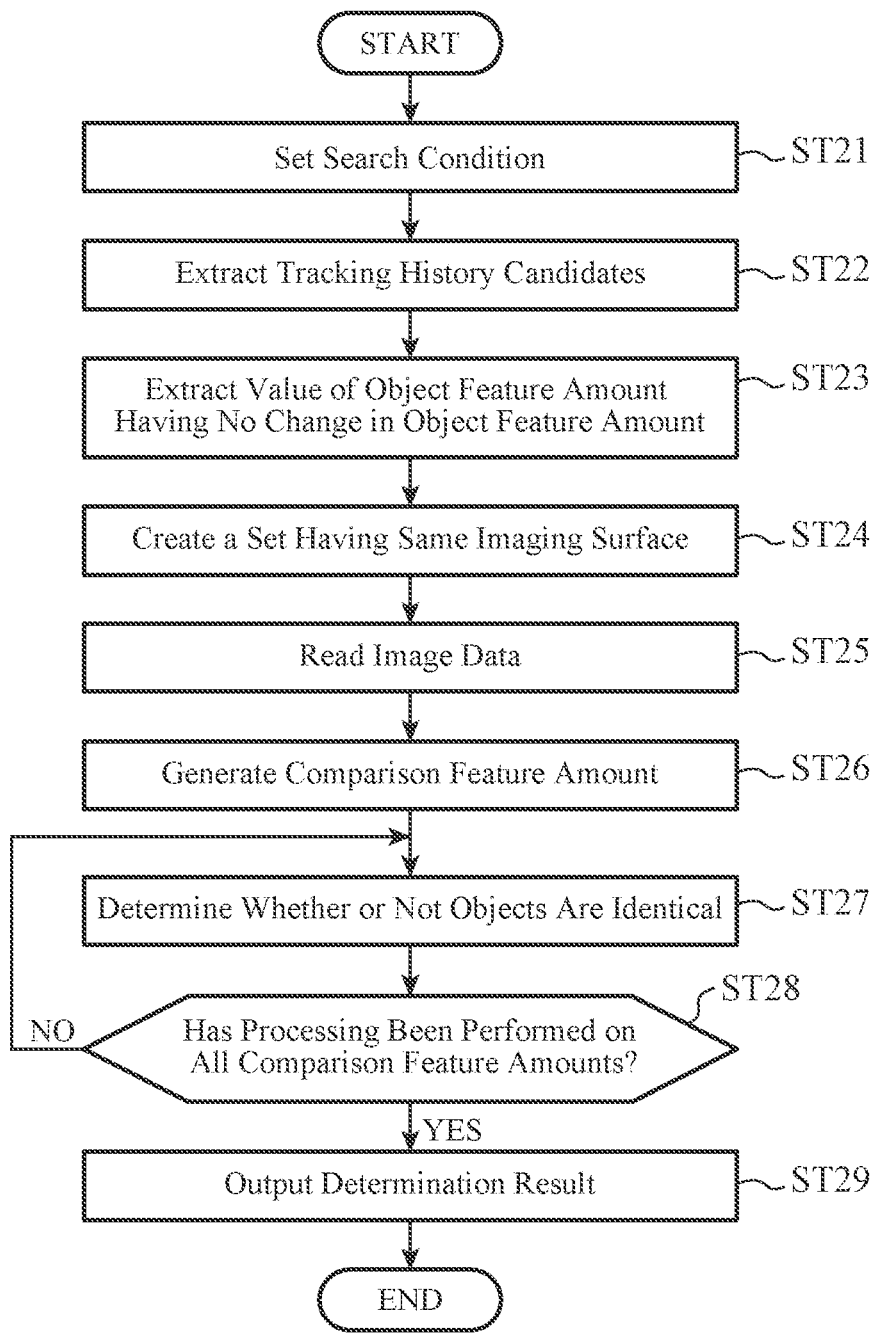
FIG. 8 is a flowchart illustrating image search processing.

Next, image search processing performed by the image processing device 100 will be described with reference to FIG. 8. FIG. 8 is a flowchart illustrating the image search processing.

When the search condition is set from the external device 3 via the interface unit 104 (step ST21), the search unit 121 extracts a plurality of object tracking history candidates matching the set search condition from the data storage unit 103 via the recording control unit 102 (step ST22), and outputs the extracted object tracking history candidates to the tracking history extracting unit 122.

The tracking history extracting unit 122 extracts values of object feature amounts obtained by excluding data determined as "having a change in object feature amount" from values of a plurality of object feature amounts included in the object tracking history input from the search unit 121 (step ST23). That is, the tracking history extracting unit 122 extracts the value of the object feature amount of an image determined to have no change in the object feature amount from the object tracking history. Furthermore, the tracking history extracting unit 122 creates a set of objects having the same imaging surface with respect to data determined as "having no change in object feature amount" (step ST24), and outputs the created set and the object tracking history to the feature amount extracting unit 123 as a tracking-history extraction result.

The feature amount extracting unit 123 extracts data of an image including an object corresponding to the tracking-history extraction result from the data storage unit 103 via the recording control unit 102 on the basis of the tracking-history extraction result input from the tracking history extracting unit 122 (step ST25). The feature amount extracting unit 123 generates, on the basis of an image feature amount obtained from data of a plurality of images corresponding to a set of objects having the same imaging surface, one comparison feature amount for the set (step ST26).

The determination unit 124 compares the object tracking histories having the same imaging surface between different imaging regions through comparison with the comparison feature amount extracted in step ST26. As a result, the determination unit 124 determines whether or not the objects imaged in different imaging regions are identical (step ST27). The determination unit 124 determines whether or not processing has been performed on all the comparison feature amounts input from the feature amount extracting unit 123 (step ST28). If the processing has not been performed on all the comparison feature amounts (step ST28: No), the flowchart returns to the process of step ST27. On the other hand, if the processing has been performed on all the comparison feature amounts (step ST28: Yes), the determination unit 124 outputs the determination result to the external device 3 via the interface unit 104 (step ST29), and ends the processing.

SPECIFIC EXAMPLE

Figure 9:
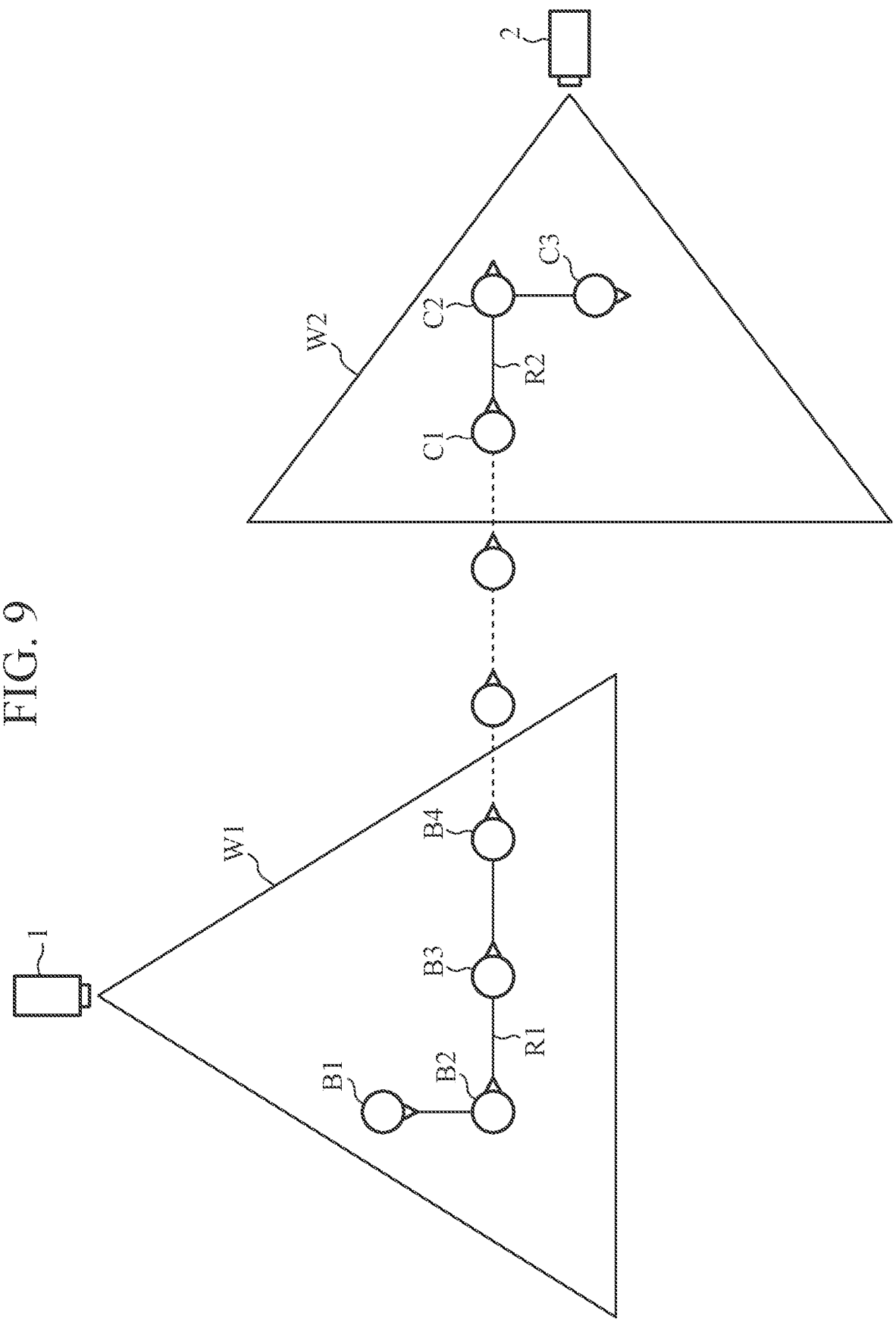
FIG. 9 is a diagram illustrating an example of image recognition processing.

FIG. 9 is a diagram illustrating an example of image recognition processing performed by the image processing device 100 according to the first embodiment. In FIG. 9, the tracking unit 113 tracks objects B1 to B4 having the same feature in the image sequence obtained by imaging a region W1, and generates an object tracking history R1. Similarly, the tracking unit 113 tracks objects C1 to C3 in the image sequence obtained by imaging a region W2, and generates an object tracking history R2. Numbers added to B or C in FIG. 9 indicate that the object is imaged at different times. The tracking history includes an observation value and a prediction value related to a position, a speed, and a range of each object at each imaging time, a tracking ID, a feature-amount-change detection result, and an imaging-surface estimation result.

Figure 10A:
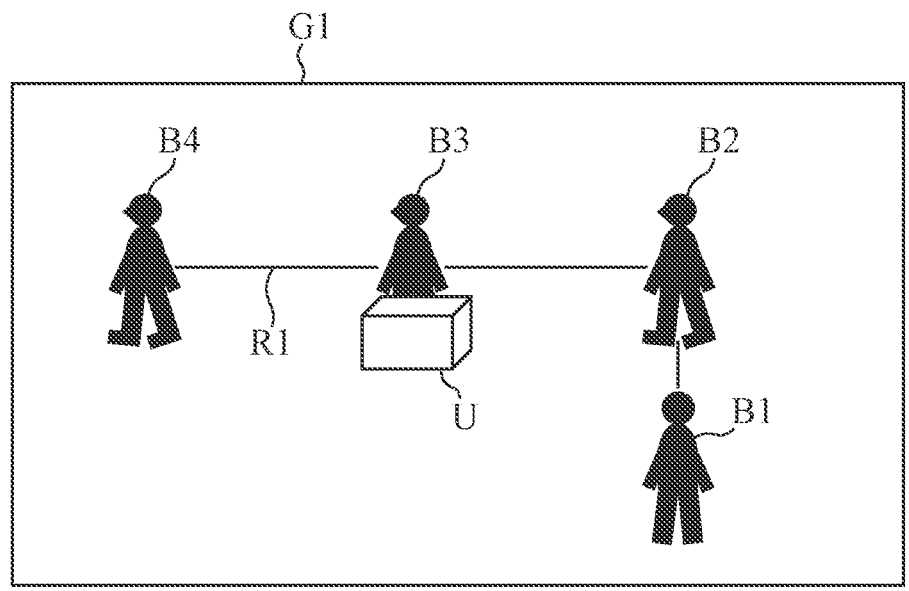
FIG. 10A is a diagram illustrating an example of image data of a person tracked as an object in a region W1 in FIG. 9.
Figure 10B:
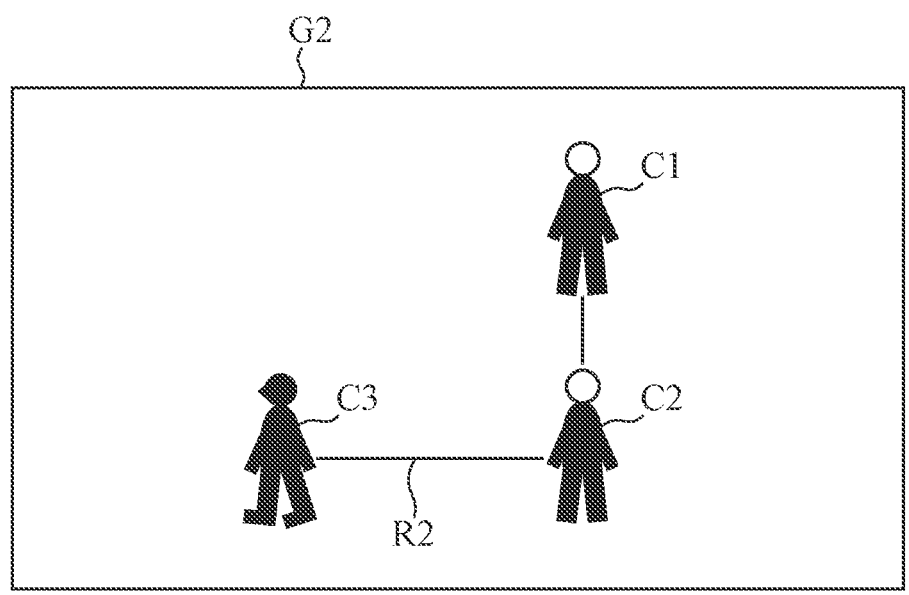
FIG. 10B is a diagram illustrating an example of image data of a person tracked as an object in a region W2 in FIG. 9.

FIGS. 10A and 10B are diagrams corresponding to FIG. 9 and illustrating an example of image data including a person tracked as an object in processing of tracking the image recognition result by the image processing device 100. FIG. 10A illustrates an example of image data of an object B in an image region G1 imaged by the camera 1, and FIG. 10B illustrates an example of image data of an object C in an image region G2 imaged by the camera 2. In the image region G1 of the camera 1, B1 indicates that the back surface of the object B is imaged, and B2 and B3 indicate that the left side face of the object B is imaged as illustrated in FIG. 10A. Furthermore, in the image region G2 of the camera 2, C1 and C2 indicate that the front surface of the object C is imaged, and C3 indicates that the left side face of the object C is imaged as illustrated in FIG. 10B.

As illustrated in FIG. 10A, when the same object B is tracked, a part of the object B3 may be hidden by an obstacle U, for example. Alternatively, when the same object is tracked, the imaging surface may change depending on the relative relationship between the arrangement position of the camera and the moving direction of the person, and the imaged content may be different. Therefore, in a case where the objects are compared using the data (for example, B2 and C2) of one image of each of the objects in FIGS. 10A and 10B, the accuracy of determining whether or not the objects are identical in step ST27 decreases. In addition, in a case where feature amounts are extracted from a cluster having the largest number of images included therein from clusters including a plurality of images associated with the object tracking history to identify whether or not the objects are identical, the feature amounts are extracted from B2, B3, and B4 for the camera 1 and from C1 and C2 for the camera 2. In a case where the feature of the object changes depending on the imaging surface, the accuracy of determining whether or not the objects are identical decreases between the object tracking history R1 with the camera 1 and the object tracking history R2 with the camera 2. In addition, in a case where the feature amount is extracted using B3 in which occlusion has occurred, the accuracy of determining whether or not the objects are identical also decreases.

In view of this, the image search unit 120 defines, for example, four imaging surfaces (reference surfaces) for each object included in G1 in FIG. 10, and extracts a feature amount for each imaging surface of the object for the data of the image determined to have no change in the feature amount. Specifically, one feature amount is extracted from B4 and B2 having the same imaging surface, and one feature amount is extracted from B1. Similarly, for each object included in G2 of FIG. 10, one feature amount is extracted from C1 and C2 having the same imaging surface, and one feature amount is extracted from C3. The determination unit 124 determines whether or not the objects are identical by comparing the feature amount extracted from B4 and B2 with the feature amount extracted from C3, the objects B4 and B2 and the object C3 having the same imaging surface in different imaging regions. This makes it possible to suppress a decrease in the accuracy of determining whether or not the objects are identical. That is, an image in which occlusion has occurred can be excluded by using the data of the image determined to have no change in the feature amount, whereby a decrease in accuracy of determining whether or not the objects are identical can be suppressed. Furthermore, a change in the feature amount due to a change in the imaging surface can be avoided by extracting the feature amount for each imaging surface, whereby a decrease in accuracy of determining whether or not the objects are identical can be suppressed.

<Supplementary Matter>

A part of various aspects of the embodiment described above will be summarized below.

(Supplementary Matter 1)

An image processing device (100) according to supplementary matter 1 includes: a detection unit (111) to analyze a first image sequence including a plurality of images obtained by imaging a first region (W1) to detect a first object (B1) that appears in any one of the images of the first image sequence, and analyze a second image sequence including a plurality of images obtained by imaging a second region (W2) different from the first region to detect a second object (C1) that appears in any one of the images of the second image sequence; a feature amount generating unit (112) to generate a first object feature amount for tracking the first object and a second object feature amount for tracking the second object; a tracking unit (113) to track the first object in a time direction within the first image sequence using the first object feature amount to output a tracking result including a plurality of values of the first object feature amount (for example, observation value of the size of the first object) as a first object tracking history (R1), and track the second object in the time direction within the second image sequence using the second object feature amount to output a tracking result including a plurality of values of the second object feature amount (for example, observation value of the size of the second object) as a second object tracking history (R2); a feature amount change detecting unit (114) to detect whether or not the first object feature amount has changed using the first object tracking history to output a detection result as a first feature-amount-change detection result, and detect whether or not the second object feature amount has changed using the second object tracking history to output a detection result as a second feature-amount-change detection result; a tracking history extracting unit (122) to extract a value of the first object feature amount from the first object tracking history for an image (images of B1, B2, and B4) determined to have no change in the first object feature amount to output the extracted value of the first object feature amount and the first object tracking history as a first tracking-history extraction result, and extract a value of the second object feature amount from the second object tracking history for an image (images of C1 to C3) determined to have no change in the second object feature amount to output the extracted value of the second object feature amount and the second object tracking history as a second tracking-history extraction result; and a determination unit (124) to determine whether or not the first object and the second object are identical using the first tracking-history extraction result and the second tracking-history extraction result.

(Supplementary Matter 2)

According to supplementary mater 2, the image processing device according to supplementary matter 1 further includes: an imaging surface estimating unit (115) to estimate an imaging surface of the first object from the first object tracking history to output the estimated imaging surface as a first imaging surface (imaging surfaces of B2 and B4), and estimate an imaging surface of the second object from the second object tracking history to output the estimated imaging surface as a second imaging surface (imaging surface of C3); and a feature amount extracting unit (123) to extract a first comparison feature amount for the first imaging surface of the first object, and extract a second comparison feature amount for the second imaging surface of the second object, wherein the determination unit determines whether or not the first object and the second object are identical using the first comparison feature amount and the second comparison feature amount, when the first imaging surface and the second imaging surface are the same.

(Supplementary Matter 3)

According to supplementary matter 3, in the image processing device according to supplementary matter 1 or 2, the first object tracking history includes a prediction value (for example, P3) of the first object feature amount at a time of interest (for example, t3), the prediction value being predicted on the basis of an observation value (for example, S3) of the first object feature amount observed at the time of interest and an observation value (for example, S2) of the first object feature amount observed at a past time (for example, t2) preceding the time of interest, and the feature amount change detecting unit detects whether or not the first object feature amount has changed on the basis of the observation value (S3) and the prediction value (P3) of the first object feature amount at the time of interest.

(Supplementary Matter 4)

According to supplementary matter 4, in the image processing device according to any one of supplementary matters 1 to 3, the first object tracking history includes a speed of the first object, and an imaging surface estimating unit estimates a first imaging surface from the speed of the first object.

(Supplementary Matter 5)

According to supplementary matter 5, in the image processing device according to any one of supplementary matters 1 to 4, a feature amount extracting unit generates, on the basis of an image feature amount obtained from data of a plurality of images corresponding to a set of the first objects having a same imaging surface, a first comparison feature amount for the set.

(Supplementary Matter 6)

An image processing method according to supplementary matter 6 is a method performed by an image processing device, the method including: analyzing a first image sequence including a plurality of images obtained by imaging a first region to detect a first object that appears in any one of the images of the first image sequence, and analyzing a second image sequence including a plurality of images obtained by imaging a second region different from the first region to detect a second object that appears in any one of the images of the second image sequence, by a detection unit (111) (ST2); generating a first object feature amount for tracking the first object and a second object feature amount for tracking the second object by a feature amount generating unit (112) (ST4); tracking the first object in a time direction within the first image sequence using the first object feature amount to output a tracking result including a plurality of values of the first object feature amount as a first object tracking history, and tracking the second object in the time direction within the second image sequence using the second object feature amount to output a tracking result including a plurality of values of the second object feature amount as a second object tracking history, by a tracking unit (113) (ST5 to ST7); detecting whether or not the first object feature amount has changed using the first object tracking history to output a detection result as a first feature-amount-change detection result, and detecting whether or not the second object feature amount has changed using the second object tracking history to output a detection result as a second feature-amount-change detection result, by a feature amount change detecting unit (114) (ST8); extracting a value of the first object feature amount from the first object tracking history for an image determined to have no change in the first object feature amount to output the extracted value of the first object feature amount and the first object tracking history as a first tracking-history extraction result, and extracting a value of the second object feature amount from the second object tracking history for an image determined to have no change in the second object feature amount to output the extracted value of the second object feature amount and the second object tracking history as a second tracking-history extraction result, by a tracking history extracting unit (122) (ST23); and determining whether or not the first object and the second object are identical using the first tracking-history extraction result and the second tracking-history extraction result by a determination unit (124) (ST27).

Note that the embodiments can be combined, and each of the embodiments can be appropriately modified or omitted.

INDUSTRIAL APPLICABILITY

The image processing device according to the present disclosure can be used in an image processing system that monitors an object.

REFERENCE SIGNS LIST

1: camera, 2: camera, 3: external device, 100: image processing device, 100a: processing circuit, 100b: processor, 100c: memory, 101: communication unit, 102: recording control unit, 103: data storage unit, 104: interface unit, 110: image recognition unit, 111: detection unit, 112: feature amount generating unit, 113: tracking unit, 114: feature amount change detecting unit, 115: imaging surface estimating unit, 120: image search unit, 121: search unit, 122: tracking history extracting unit, 123: feature amount extracting unit, 124: determination unit, Sys: image processing system

The invention claimed is:

1. An image processing device comprising:
processing circuitry configured to
analyze a first image sequence including a plurality of images obtained by imaging a first region to detect a first object that appears in any one of the images of the first image sequence, and analyze a second image sequence including a plurality of images obtained by imaging a second region different from the first region to detect a second object that appears in any one of the images of the second image sequence;
generate a first object feature amount for tracking the first object and a second object feature amount for tracking the second object;
track the first object in a time direction within the first image sequence using the first object feature amount to output a tracking result including a plurality of values of the first object feature amount as a first object tracking history, and track the second object in the time direction within the second image sequence using the second object feature amount to output a tracking result including a plurality of values of the second object feature amount as a second object tracking history;
detect whether or not the first object feature amount has changed using the first object tracking history to output a detection result as a first feature-amount-change detection result, and detect whether or not the second object feature amount has changed using the second object tracking history to output a detection result as a second feature-amount-change detection result;

extract a value of the first object feature amount from the first object tracking history for an image determined to have no change in the first object feature amount to output the extracted value of the first object feature amount and the first object tracking history as a first tracking-history extraction result, and extract a value of the second object feature amount from the second object tracking history for an image determined to have no change in the second object feature amount to output the extracted value of the second object feature amount and the second object tracking history as a second tracking-history extraction result; and determine whether or not the first object and the second object are identical using the first tracking-history extraction result and the second tracking-history extraction result.

2. The image processing device according to claim 1, wherein the processing circuitry is further configured to estimate an imaging surface of the first object from the first object tracking history to output the estimated imaging surface as a first imaging surface, and estimate an imaging surface of the second object from the second object tracking history to output the estimated imaging surface as a second imaging surface;

extract a first comparison feature amount for the first imaging surface of the first object, and extract a second comparison feature amount for the second imaging surface of the second object; and determine whether or not the first object and the second object are identical using the first comparison feature amount and the second comparison feature amount, when the first imaging surface and the second imaging surface are the same.

3. The image processing device according to claim 2, wherein the first object tracking history includes a prediction value of the first object feature amount at a time of interest, the prediction value being predicted on a basis of an observation value of the first object feature amount observed at the time of interest and an observation value of the first object feature amount observed at a past time preceding the time of interest, and the processing circuitry detects whether or not the first object feature amount has changed on a basis of the observation value and the prediction value of the first object feature amount at the time of interest.

4. The image processing device according to claim 3, wherein the first object tracking history includes a speed of the first object, and the processing circuitry estimates the first imaging surface from the speed of the first object.

5. The image processing device according to claim 2, wherein the processing circuitry generates, on a basis of an image feature amount obtained from data of a plurality of images corresponding to a set of the first objects having a same imaging surface, the first comparison feature amount for the set.

6. An image processing method performed by an image processing device, the method comprising:

analyzing a first image sequence including a plurality of images obtained by imaging a first region to detect a first object that appears in any one of the images of the first image sequence, and analyzing a second image sequence including a plurality of images obtained by imaging a second region different from the first region to detect a second object that appears in any one of the images of the second image sequence;

generating a first object feature amount for tracking the first object and a second object feature amount for tracking the second object;

tracking the first object in a time direction within the first image sequence using the first object feature amount to output a tracking result including a plurality of values of the first object feature amount as a first object tracking history, and tracking the second object in the time direction within the second image sequence using the second object feature amount to output a tracking result including a plurality of values of the second object feature amount as a second object tracking history;

detecting whether or not the first object feature amount has changed using the first object tracking history to output a detection result as a first feature-amount-change detection result, and detecting whether or not the second object feature amount has changed using the second object tracking history to output a detection result as a second feature-amount-change detection result;

extracting a value of the first object feature amount from the first object tracking history for an image determined to have no change in the first object feature amount to output the extracted value of the first object feature amount and the first object tracking history as a first tracking-history extraction result, and extracting a value of the second object feature amount from the second object tracking history for an image determined to have no change in the second object feature amount to output the extracted value of the second object feature amount and the second object tracking history as a second tracking-history extraction result; and determining whether or not the first object and the second object are identical using the first tracking-history extraction result and the second tracking-history extraction result.

* * * * *